United States Patent Office
2,760,983
Patented Aug. 28, 1956

2,760,983

PROCESS FOR CONDENSING FORMALDEHYDE

Alexander F. MacLean and Walter E. Heinz, Corpus Christi, Tex., assignors to Celanese Corporation of America, New York, N. Y., a corporation of Delaware No Drawing. Application May 24, 1952,
Serial No. 289,894

4 Claims. (Cl. 260—594)

This invention relates to a process for converting formaldehyde to carbohydrates, and relates more particularly to a continuous process for converting formaldehyde to lower molecular weight carbohydrates which may be hydrogenated to produce lower polyhydric alcohols.

It is well known that aqueous solutions of formaldehyde will condense in the presence of a catalyst to produce a mixture of carbohydrates. The resulting carbohydrate mixture is useful, for example, as a source of polyhydric alcohols, which may be produced by the hydrogenation of the mixture. Most of the earlier research on formaldehyde condensation has resulted in the synthesis of a complex carbohydrate mixture, composed primarily of pentoses and hexoses, which yields, on hydrogenation, a mixture of five- and six-carbon atom polyhydric alcohols. It is desirable for many purposes to obtain a carbohydrate mixture composed primarily of the lower molecular weight carbohydrates, such as glycollic aldehydes, dihydroxy acetone, glyceraldehyde, and erythrose isomers. Such a carbohydrate mixture yields on hydrogenation a mixture which is principally ethylene glycol, glycerol, and erythritol.

It is also desirable to have the process operate continuously so as to make maximum economical use of the equipment. A continuous process for the condensation of formaldehyde has been sought for by persons skilled in this art, but such processes did not produce a sufficiently high yield of the desired lower molecular weight carbohydrates to be commercially feasible.

It is, therefore, an object of our invention to provide a practical process for condensing formaldehyde to give high yields of lower molecular weight carbohydrates.

A further object is the provision of a process for condensing aqueous formaldehyde continuously to give high yields of lower molecular weight hydroxy aldehydes and hydroxy ketones.

Other objects of this invention will appear from the following detailed description.

In prior art processes, the charge of aqueous formaldehyde and catalyst was placed in a reactor at an elevated temperature and allowed to react until a substantial amount of formaldehyde was converted to carbohydrates, following which the reaction was stopped and the charge was removed. Where the process was continuous, essentially the same operation was involved, except that the charge moved continuously through the reactor and the reaction mixture was removed continuously from the reactor.

In the process of the present invention, the aqueous formaldehyde is first condensed to a substantial degree in the presence of the catalyst to produce a reaction mixture having a low concentration of formaldehyde. Into this reaction mixture is then fed a charge of aqueous formaldehyde in which the concentration of formaldehyde is much higher than that of the reaction mixture. The concentration of formaldehyde in this feed may range from about 5 to 20%, which is 2 to 100 times, preferably 5 to 20 times, the concentration of formaldehyde in the reaction mixture. During the addition of the charge of aqueous formaledhyde, the reaction mixture is maintained at the desired low formaldehyde concentration by control of the rate of addition of the charge, by circulation of its contents and by removal of a portion of the reaction mixture.

In our continuous process, the aqueous formaldehyde solution, which may contain the catalyst, may be fed into a reaction zone maintained at an elevated temperature to produce a crude mixture of reaction products and catalyst. A major portion of this crude mixture is recirculated into contact with the feed and through the reaction zone, and a minor portion of this crude mixture is continuously withdrawn from the reaction zone.

In the process of our invention, optimum results are obtained when the concentration of formaldehyde in the feed is preferably about 5-20%. We have found that higher concentrations of formaldehyde in the feed are disadvantageous since such higher concentrations cause an increase in the proportion of high molecular weight carbohydrates.

The catalyst used in the process is preferably a lead salt soluble in the reaction mixture, such as lead nitrate, lead acetate or basic lead acetate. Lead oxide may also be used, since it is solubilized by the formic acid present in the reaction mixture due to the Cannizzaro reaction. The Cannizzaro reaction is a side reaction which in our process takes place to a minor degree and involves the simultaneous oxidation and reduction of formaldehyde to methanol and formic acid. Other known catalysts for the condensation may be used, such as magnesium, calcium or barium hydroxides, or tin formate. However, lead compounds are preferred, since they are much more effective. Also, when lead compounds are used the Cannizzaro reaction takes place to a much smaller extent so that there is only a slight loss of formaledhyde, i. e. to formic acid and methanol. The proportion of catalyst may be varied widely. It is found that, generally speaking a decrease in the lead concentration favors an increased efficiency of the conversion of formaldehyde to to glycerol. Preferred mole ratios of formaldehyde to lead in the feed are 100:1 to 900:1. By mole ratio of formaldehyde to lead is meant the ratio of the number of gram moles of formaldehyde to the number of gram atoms of lead.

The activity of each of the catalysts is greatly increased by the presence of an organic compound capable of producing an ene-diol grouping.

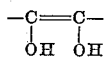

such as benzoin, hydroxy acetone, glucose, glycollic aldehyde, or a mixture of carbohydrates produced by condensation of formaldehyde. In the latter case the condensation products act as auto-catalysts, i. e. the reaction is promoted by the presence of its products. Accordingly, the reaction is started in the presence of 0.1 to 5.0% of an initiator which is one of the above ene-diol compounds. After the reaction has been started no added initiator is necessary.

Sometimes there may be a tendency for lead oxide to precipitate from the feed. It has been found that such a tendency may be overcome by the addition of a small amount of the reactor product, e. g. about 2.5% by volume, to the feed.

The pH of the reaction should be maintained at about 4 to 9, more preferably in the range of about 5.0 to 8. A pH range of 7 to 8 has been found to be most favorable to the formation of lower molecular weight carbohydrates. To control the pH alkaline materials may be used, e. g. triethyl amine, lime or sodium hydroxide.

The condensation may be carried out continuously in any desired apparatus. For example, the formaldehyde may be fed continuously directly into a reactor with stirring and the product removed directly from the reactor. Here back-mixing, or recycling, of feed and reaction products is substantially complete. Another form of apparatus involves a series of long tubes through which the feed is passed and reacted under controlled temperature and pH conditions, and a series of tubes and valves whereby most of the effluent from the tube reactor is recycled to the feed point to provide a high degree of back-mixing of feed and reaction products.

The temperature of condensation may range from 80 to 130° C., preferably 95 to 105° C. The residence time in the reactor may range from 5 to 100 min., preferably 10 to 50 min.

In order further to illustrate our invention, but without being limited thereto, the following examples are given:

Example I

An aqueous mixture containing 5% by weight of formaldehyde and sufficient basic lead acetate to give a mole ratio of formaldehyde to lead atoms of 183:1 and the balance water, was pumped continuously into a reactor provided with a reflux condenser and a stirrer and having an adjustable overflow arrangement for maintaining the liquid therein at any desired constant level. The contents of the reactor were maintained at 100° C., were maintained at a pH of 5.9 by additions of triethyl amine and were circulated continuously by stirring so that there was almost complete back-mixing of feed and product. The feed was pumped in at such a rate as to give a residence time in the reactor of 27 minutes. Thus, for a reactor in which the overflow is set at a level to provide a reactor capacity of 300 volumes, the pumping rate was 11.1 volumes per minute. Under these conditions the formaldehyde concentration in the reactor was about 1.0%. The effluent, from the overflow, was cooled to a temperature of 20° C. to stop the reaction.

In order to start the continuous process, the formaldehyde solution initially fed into the reactor contained 0.1% of an initiator, specifically glucose or a carbohydrate mixture prepared by formaldehyde condensation.

Analysis of the effluent showed that 91% of the formaldehyde had been converted to condensation product, that the efficiency of conversion of formaldehyde to condensation product was 93%. The distribution of the various carbohydrates in the effluent was determined by removal of ions and free formaldehyde from the effluent followed by hydrogenation in the presence of Raney nickel. After such hydrogenation the effluent showed an efficiency of conversion of formaldehyde to ethylene glycol, derived from two-carbon carbohydrate, of 13.1%; to glycerol, derived from three-carbon carbohydrates, of 25.1%; to erythritol, derived from four-carbon carbohydrates, of 34.3%; and to higher molecular weight non-volatile compounds of 18.0%.

Example II

Example I was repeated except that the formaldehyde concentration in the feed was 10%, the mole ratio of formaldehyde to lead was 732:1, the pH was maintained at 7.4 in the reactor and the residence time was 50 minutes. This resulted in a conversion of formaldehyde to condensation product of 85.7% and, by analysis of the hydrogenation products, an efficiency of conversion of formaldehyde to ethylene glycol of 15.8%, to glycerol of 46.7%, to erythritol of 21.5%, and to higher molecular weight non-volatile compounds of 9.9%.

It is to be understood that the foregoing detailed description is given merely by way of illustration and that many variations may be made therein without departing from the spirit of our invention.

Having described our invention, what we desired to secure by Letters Patent is:

1. A process for the production of carbohydrates, which comprises continuously circulating a reaction mixture produced by the condensation of aqueous formaldehyde in the presence of a catalyst for the condensation of formaldehyde to carbohydrates at a pH of 5 to 8, said circulating reaction mixture being maintained at a pH of 5 to 8 and at a temperature of 80 to 130° C., supplying to said circulating reaction mixture an aqueous mixture comprising about 5 to 20% of formaldehyde, which concentration of formaldehyde in said aqueous mixture is from 5 to 20 times the concentration of formaldehyde in said reaction mixture, simultaneously with the addition of said aqueous mixture withdrawing a portion of said reaction mixture, the rate of addition of said aqueous mixture to the circulating reaction mixture and the rate of withdrawal of said reaction mixture from the body thereof being such that the concentration of formaldehyde in the reaction mixture is maintained at 5 to 20% of the concentration of the formaldehyde in the aqueous mixture, and stopping the condensation reaction in said withdrawn portion.

2. A process for the production of carbohydrates, which comprises continuously circulating a reaction mixture produced by the condensation of aqueous formaldehyde in the presence of a catalyst for the condensation of formaldehyde to carbohydrates at a pH of 5 to 8, said circulating reaction mixture being maintained at a pH of 5 to 8 and at a temperature of 80 to 130° C., supplying to said circulating reaction mixture an aqueous mixture comprising about 5 to 20% of formaldehyde, which concentration of formaldehyde in said aqueous mixture is from 5 to 20 times the concentration of formaldehyde in said reaction mixture, and a catalyst for the condensation of formaldehyde to carbohydrates, simultaneously with the addition of said aqueous mixture withdrawing a portion of said reaction mixture, the rate of addition of said aqueous mixture to the circulating reaction mixture and the rate of withdrawal of said reaction mixture from the body thereof being such that the concentration of formaldehyde in the reaction mixture is maintained at 5 to 20% of the concentration of the formaldehyde in the aqueous mixture, and stopping the condensation reaction in said withdrawn portion.

3. A process for the production of carbohydrates, which comprises continuously circulating a reaction mixture produced by the condensation of aqueous formaldehyde in the presence of a catalyst for the condensation of formaldehyde to carbohydrates at a pH of 5 to 8, said circulating reaction mixture being maintained at a pH of 5 to 8 and at a temperature of 80 to 130° C., continuously supplying to said circulating reaction mixture an aqueous mixture comprising about 5 to 20% of formaldehyde, which concentration of formaldehyde in said aqueous mixture is from 5 to 20 times the concentration of formaldehyde in said reaction mixture, and a lead catalyst for the condensation of formaldehyde to carbohydrates, simultaneously with the addition of said aqueous mixture withdrawing a portion of said reaction mixture, the rate of addition of said aqueous mixture to the circulating reaction mixture and the rate of withdrawal of said reaction mixture from the body thereof being such that the concentration of formaldehyde in the reaction mixture is maintained at 5 to 20% of the concentration of the formaldehyde in the aqueous mixture, and stopping the condensation reaction in said withdrawn portion.

4. A process for the production of carbohydrates, which comprises continuously circulating a reaction mixture produced by the condensation of aqueous formaldehyde in the presence of a catalyst for the condensation of formaldehyde to carbohydrates at a pH of 7 to 8, said circulating reaction mixture being maintained at a pH of 7 to 8 and at a temperature of 100° C., continuously supplying to said circulating reaction mixture an aqueous mixture comprising about 5 to 20% of formaldehyde in said reaction mixture, and a dissolved lead catalyst for the condensation of formaldehyde to carbohydrates and a base, simultaneously with the addition of said aqueous mixture withdrawing a portion of said reaction mixture, the rate of addition of said aqueous mixture to the circulating reaction mixture and the rate of withdrawal of said reaction mixture from the body thereof being such that the concentration of formaldehyde in the reaction mixture is maintained at 5 to 20% of the concentration of the formaldehyde in the aqueous mixture, and stopping the condensation reaction in said withdrawn portion.

References Cited in the file of this patent

UNITED STATES PATENTS

| | | |
|---|---|---|
| 2,224,910 | Hanford et al. | Dec. 17, 1940 |
| 2,269,935 | Hanford et al. | Jan. 13, 1942 |

FOREIGN PATENTS

| | | |
|---|---|---|
| 513,708 | Great Britain | Oct. 19, 1939 |